United States Patent [19]

Goodman

[11] Patent Number: 4,773,307
[45] Date of Patent: Sep. 27, 1988

[54] METHOD AND APPARATUS FOR PREVENTING CABIN DEPRESSURIZATION

[75] Inventor: Robert B. Goodman, West Hartford, Conn.

[73] Assignee: United Technologies Corporation, Hartford, Conn.

[21] Appl. No.: 45,342

[22] Filed: May 4, 1987

[51] Int. Cl.$^4$ .......................................... B64D 13/04
[52] U.S. Cl. ..................................................... 98/1.5
[58] Field of Search ........................... 98/1.5; 137/100

[56] References Cited

U.S. PATENT DOCUMENTS

| | | | |
|---|---|---|---|
| 2,451,280 | 10/1948 | Del Mar | 98/1.5 X |
| 2,578,773 | 12/1951 | Arthur | 98/1.5 |
| 2,665,623 | 1/1954 | Kemper | 98/1.5 |
| 2,672,086 | 3/1954 | Jensen | 98/1.5 |
| 2,692,545 | 10/1954 | Arthur et al. | 98/1.5 |
| 2,734,442 | 2/1956 | Jensen | 98/1.5 |
| 2,749,828 | 6/1956 | Kemper et al. | 98/1.5 |
| 2,767,637 | 10/1956 | Maas | 98/1.5 |
| 2,773,440 | 12/1956 | Arthur | 98/1.5 |
| 2,854,913 | 10/1958 | Brahm | 98/1.5 |
| 2,884,845 | 5/1959 | Beggs | 98/1.5 |
| 2,966,109 | 12/1960 | Best | 98/1.5 |
| 3,053,162 | 9/1962 | Andresen, Jr. | 98/1.5 |
| 3,078,778 | 2/1963 | Best | 98/1.5 |
| 3,362,424 | 1/1968 | Smith et al. | 137/220 |
| 3,376,802 | 4/1968 | Emmons | 98/1.5 |
| 3,450,020 | 6/1969 | Andresen, Jr. | 98/1.5 |
| 3,650,197 | 3/1972 | Voronin et al. | 98/1.5 |
| 3,703,139 | 11/1972 | Furlong | 98/1.5 |
| 3,706,270 | 12/1972 | Furlong | 98/1.5 |
| 4,284,237 | 8/1981 | Harris et al. | 98/1.5 X |

Primary Examiner—Harold Joyce
Attorney, Agent, or Firm—Lloyd D. Doigan

[57] ABSTRACT

An environmental control system (ECS) (10) utilizes an override valve (26) to prevent accidental aircraft cabin (16) depressurization. An ECS override valve (26) determines the difference between the pressure of air in a cabin and the pressure of air input to the cabin. If the pressure of the air input to the cabin is less than a given amount more than the pressure of the air in the cabin, the valve interrupts a lower pressure signal provided by the pilot so that the pressure of the air input to the cabin is greater than the given amount more than the pressure of the air in the cabin.

3 Claims, 2 Drawing Sheets

METHOD AND APPARATUS FOR PREVENTING CABIN DEPRESSURIZATION

DESCRIPTION

1. Technical Field

The present invention relates to an environmental control system (ECS) for an aircraft, and more particularly, to an environmental control system which prevents accidental aircraft cabin depressurization.

2. Background Art

Environmental control systems generally condition and modulate pressurized air which is input to an aircraft cabin. The pressure of the air passing through the environmental control system to the aircraft cabin, is generally modulated by a pressure regulating valve. The pressure regulating valve varies the amount of pressure admitted through the environmental control system to the cabin as a function of altitude. As an aircraft climbs, the pressure of the air admitted to the cabin is lowered.

Generally, the aircraft pilot is able to reduce the pressure of the air input to the cabin. This is particularly important when the air conditioning loads of the cabin are low, such as on a cool day or there is a low passenger count. Because the air that is input to the system is bled from the aircraft engines, lowering air pressure settings reduces bleed air and increases engine efficiency.

However, if the pilot reduces the air pressure too much for a given altitude, the cabin can begin to depressurize.

DISCLOSURE OF THE INVENTION

It is, accordingly, an object of this invention to allow the pilot to set the pressure of the air input to the cabin through the environmental control system with a minimal probability of cabin depressurization.

According to the invention, a method and apparatus for preventing cabin depressurization is provided. The difference between the pressure of the air input to the cabin and the pressure of the air within the cabin is determined. If the difference between pressure of the air input to the body and the air in the cabin is less than a given amount, a signal by the pilot to regulate the pressure within the cabin is moderated to ensure that the pressure differential does not fall below the given amount so that the cabin does not depressurize.

The foregoing, and other features and advantages of the present invention will become more apparent in light of the following detailed description and accompanying drawing.

BEST MODE FOR CARRYING OUT THE INVENTION

Figure 1:
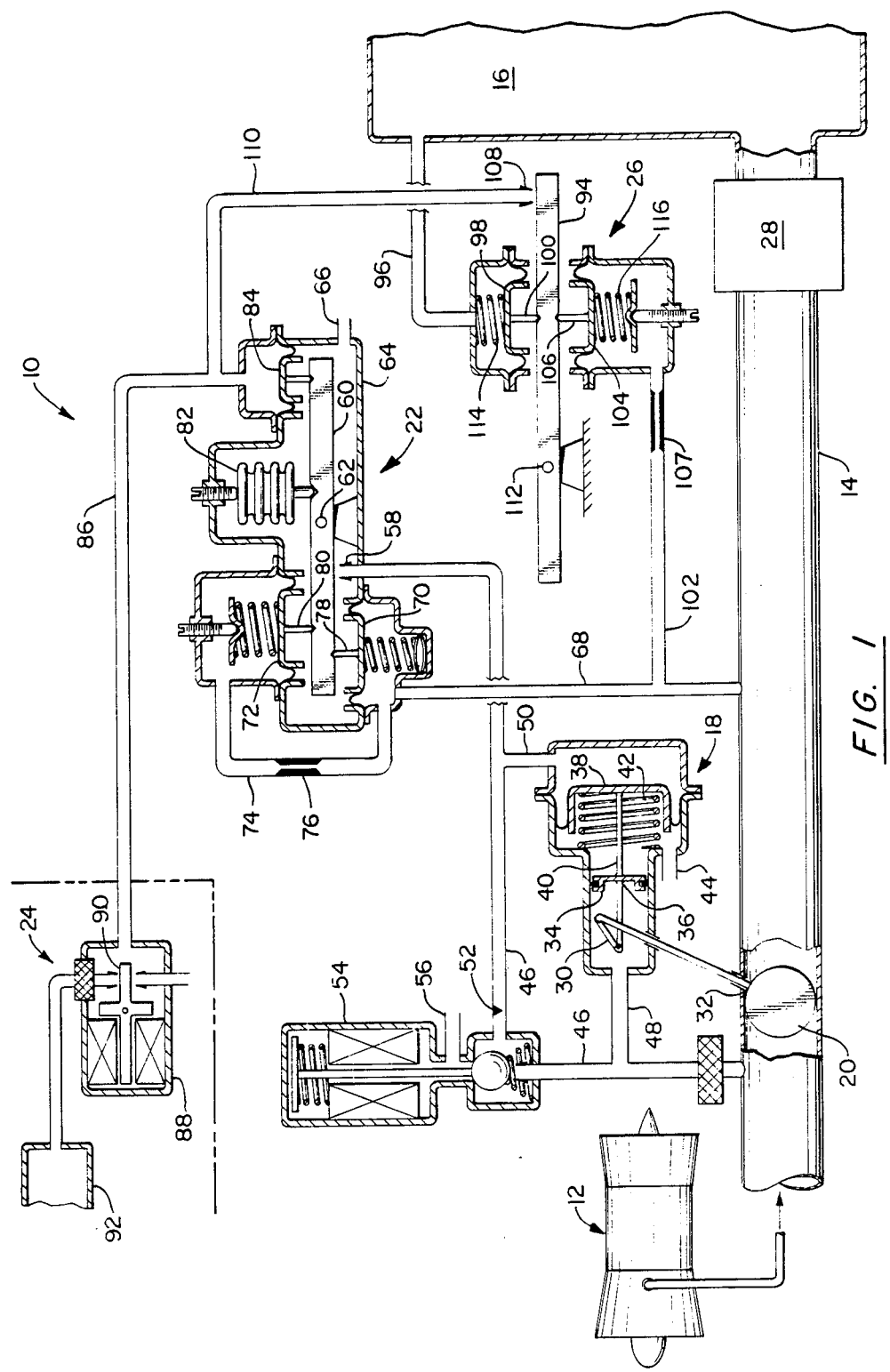
FIG. 1 is a schematic view of an environmental control system of the invention.

Referring to FIG. 1, an aircraft environmental control system (ECS) 10 is shown. The ECS receives a flow of air bled from a gas turbine engine 12 and directs the air flow via conduit 14 to the aircraft cabin 16.

The ECS 10 encompasses several major components. A half area actuator 18 regulates the flow of bled air through the conduit by positioning a damper 20. The position of the half area actuator is controlled by a pressure regulating valve (PRV) 22 which compares air pressure downstream of the damper (regulated pressure) with ambient pressure to control the pressure of the cabin 16 as a function of altitude. A pneumatic actuator 24 allows the pilot to set the pressure of the cabin by adjusting the pressure regulating valve. An override valve 26 protects the cabin from depressurization should the pilot request a cabin pressure that is inappropriate for a given altitude. An aircycle refrigeration unit 28 (as is well known in the art) regulates the temperature of the air flow entering the cabin.

The half area actuator 18 consists of: a linkage 30 which attaches at a first end 32 to the damper 20; a piston 34 which attaches at a second end 36 of the linkage; a diaphragm 38 which is connected to the piston by a rod 40; and, a spring 42 which biases the diaphragm to the right. The volume between the piston and the diaphragm is vented via line 44 to the atmosphere. As will be readily appreciated, when the fluid pressure force of the piston overcomes the fluid pressure force on the diaphragm and the force on the spring, the piston and diaphragm will move to the right pivoting the damper 20 to shut flow through the conduit 14. Likewise, when the fluid pressure force on the diaphragm overcomes the fluid pressure force on the piston, the piston and diaphragm will move to the left pivoting the damper to open flow through the conduit 14.

Line 46 brings the fluid pressure force of the air upstream of the damper to bear upon the half area actuator. The fluid pressure force influences piston 34 via line 48 and influences diaphragm 38 via line 50. The line 46 is provided with a flow restrictor 52 and a solenoid actuated valve 54 which communicates with the atmosphere via line 56. Actuation of the solenoid closes the valve whereupon the right side of the actuator is vented to the atmosphere via line 56 thereby closing the damper 20. Line 46 is provided with a vent 58, the area of which is controlled by the PRV 22.

The PRV 22 controls the pressure of the air input to the cabin as a function of altitude by comparing pressure of the air passing through the conduit 14 with atmospheric pressure. A closure beam 60 is mounted at a fulcrum 62 within a chamber 64. The chamber is vented to the atmosphere via line 66. The fluid pressure force of the air at regulated pressure (downstream of the damper 20) is brought to bear on the left side of the beam by line 68 which feeds the fluid pressure force to a first diaphragm 70 and to a second diaphragm 72 via line 74. Line 74 has a dynamic lead-lag compensating flow restrictor 76 within as is well known in the art. The first and second diaphragms are each connected to the closure beam by a first and second rod (78, 80) respectively. Changes in regulated pressure move the beam towards and away from the vent 58 as will be discussed herein. An evacuated bellows 82 is attached to the right side of the beam. A third diaphragm is attached to the right side of the beam. The third diaphragm 84 attaches via line 86 to the pneumatic actuator 24.

The pneumatic actuator biases the PRV 22 via the third diaphragm 84 so that the pilot can control the pressure of the cabin. A pilot controlled torque motor 88 positions a flapper 90 to direct regulated amounts of pneumatic pressure (i.e. a pressure signal) from a source 92 to the third diaphragm.

The override valve 26 compares the air pressure of the cabin 16 with the regulated pressure to divert the flow of pneumatic pressure directed to the third diaphragm 84 should the pilot choose a pressure which will tend to depressurize the cabin. The fluid pressure force of the cabin air pressure is brought to bear on a flapper 94 via line 96, a fourth diaphragm 98 and rod 100. The fluid pressure force of the regulated air pressure is brought to bear on the flapper 94 through line 102, a fifth diaphragm 104 and a rod 106. A flow restrictor 107 is placed in line 102 to minimize interaction between the PRV 22 and the override valve 26 via lines 68 and 102. The flapper is mounted for pivotable movement towards and away from line 110 by a fulcrum 112. The fourth and fifth diaphragms are each biased by a spring 114, 116 respectively. The net spring force on the flapper 94 tends to bias the flapper 94 away from vent 108 to bleed the pneumatic pressure away from the third diaphragm 84. Preferably the spring force is set at about 5 pounds so that if the regulated pressure is less than 5 pounds greater than cabin presure, the pneumatic pressure from the source 92 is bled away from the third diaphragm.

Figure 2:
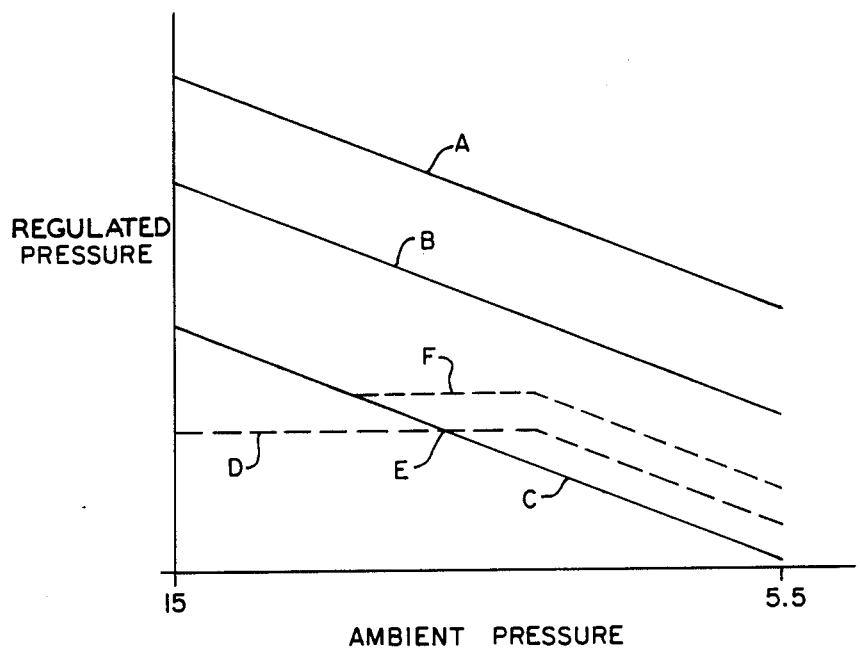
FIG. 2 is a graphical representation of the regulated pressure directed to the cabin during the various modes of operation of the environmental control system of FIG. 1.

Referring to FIG. 1 and Fig. 2 operation of the system is described as follows. Curve A in FIG. 2 shows that, as the aircraft increases in altitude, the regulated pressure delivered to the cabin decreases linearly. Essentially, the evacuated bellows 82 provides a force upon the closure beam 60 which tends to overcome the forces on the first and second diaphragms (70,72) as the aircraft climbs to move the closure beam away from the vent 58 thereby porting pressure from behind the diaphragm 38 in the half area actuator 18. The piston 34 moves to the right which pivots the damper 20 towards closing to diminish the regulated pressure passing to the cabin.

The pilot may choose to lower the regulated pressure entering the cabin by positioning the torque motor 88 to move the flapper 90 to meter pneumatic pressure to the third diaphragm 84. The added pressure on the closure beam 60 provided by the third diaphragm 84 tends to move the closure beam 60 away from the vent 58, allowing the piston to move to the right 36, closing the damper 20. The overall effect is to lower curve A, shown as curve B. The pilot may select a minimum pressure shown as curve C. However, the PRV 22 may cause the minimum pressure to fall below the desired cabin pressure (shown as curve D) at altitude. If the minimum pressure falls below the desired cabin pressure (shown at point E), the cabin will tend to depressurize. This is clearly not desirable. If the pilot selects a pressure which will tend to depressurize the cabin, the override valve 26 vents the pneumatic pressure sent through line 86 so that the pneumatic pressure (signal) does not bias the pressure regulating valve. In this manner, the minimum regulated pressure will show the characteristics of curve F. The regulated pressure does not fall below desired cabin pressure as shown by the difference between curves C and F.

while the present invention has been illustrated and described with respect to a particularly preferred embodiment thereof, it will be appreciated by those skilled in the art that various modifications to the system may be made without departing from the present invention. One of ordinary skill would recognize that the diaphragms 98, 116 might be substituted for by electrical means such as transducers which could provide a signal to control a flapper 94 or torque motor 88. Thus, it will be understood that the following claims cover the embodiment described herein and all such equivalents thereof as fall within the true spirit and scope of this invention.

Having thus described the invention, what is claimed is:

1. An environmental control system for controlling the pressure and conditioning the air input to an aircraft cabin having an air pressure said environmental control system preventing accidential cabin depressurization and being characterized by:
   means for regulating the pressure of air input to said cabin as a function of altitude;
   means for providing a signal to said means for regulating the pressure of air to control said means for regulating the pressure of said air such that the pressure of the air input to said cabin is controlled;
   means for determining the difference between the air pressure of said cabin and the pressure of air being fed to said cabin; and
   means for moderating said means for providing said signal such that said signal is moderated so that said cabin is not depressurized if said means for determining finds that the difference between the air pressure of the cabin and the pressure of the air input to the cabin falls below a given parameter so that said cabin is not depressurized.

2. A method for preventing a body of air, having a given pressure, from depressurizing, said body of air being fed air at a pressure, comprising:
   regulating said pressure of said air input to said body on a scheduled curve as a function of altitude,
   providing a signal to modulate said regulating of the pressure of the air being fed to the body to choose a particular scheduled curve as a function of altitude,
   determining the difference between said given air pressure of said body and the regulated pressure of said air being fed to said body, and
   moderating said signal if said difference falls below a given parameter such that said regulating said pressure of air fed to said body follows a curve which maintains said pressure of said air fed to said body above said pressure of said body by an amount which prevents cabin depressurization.

3. Apparatus for preventing a body of air, having a given pressure, from depressurizing, said body of air being fed air at a pressure, said apparatus comprising:
   A pressure regulating valve for comparing the pressure of the air being fed to the body and ambient pressure such that said air fed to said body is regulated by a scheduled curve as a function of altitude,
   means for providing a signal to said pressure regulating valve to bias said pressure regulating valve such that said air fed to said body is regulated at a desired scheduled curve as a function of altitude,
   means for determining a difference between said air pressure of said body and the pressure of said air being fed to said body and for moderating said signal to said pressure regulating valve if said difference falls below a given parameter such that said pressure regulating valve regulates said pressure of air fed to said body by a curve which maintains said pressure of said air fed to said body above said pressure of said body by an amount which prevents cabin depressurization.

* * * * *